H. P. HOOD.

Washers for Nut-Fastenings.

No. 134,990.            Patented Jan. 21, 1873.

WITNESSES:

INVENTOR:

Harrison P. Hood.

UNITED STATES PATENT OFFICE.

HARRISON P. HOOD, OF INDIANAPOLIS, INDIANA.

IMPROVEMENT IN WASHERS FOR NUT-FASTENINGS.

Specification forming part of Letters Patent No. 134,990, dated January 21, 1873.

*To all whom it may concern:*

Be it known that I, HARRISON P. HOOD, of Indianapolis, in the county of Marion and State of Indiana, have invented certain Improvements in Washers to be used with Bolts and Nuts, of which the following is a specification:

My invention consists of a washer provided with perforations, so arranged that, when the washer is placed under the nut or head of a bolt, nails, screws, or other suitable devices may be driven through the washer in such manner as to prevent the nut or bolt from turning; the object of my invention being to surround the nail, screw, pin, or other suitable device, when so driven, with a metallic surface, which, being held to its place by the bolt or nut, will prevent the device from being pushed to one side by the tendency of the bolt or nut to turn.

Figure 1:
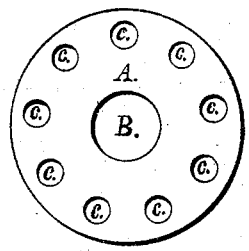
Figure 2:
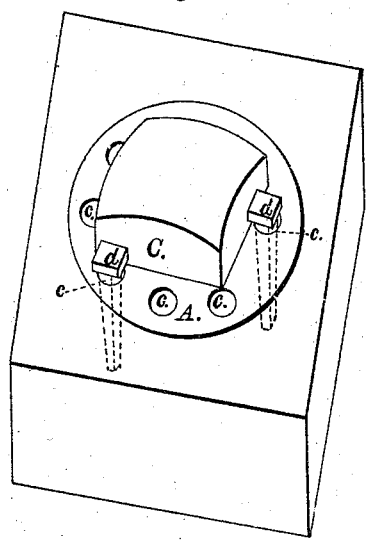
Figure 3:
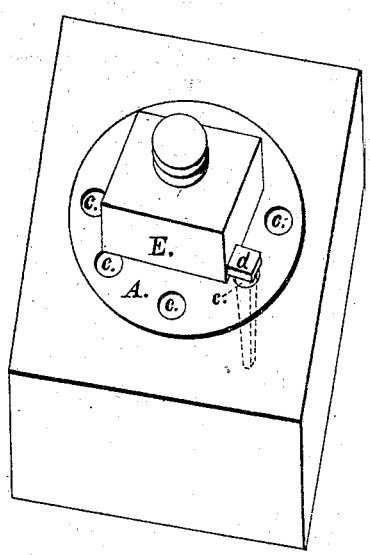

Figure 1 is a plan of my invention. Fig. 2 is a plan showing its application to the head of a bolt. Fig. 3 is a plan showing its application to a nut.

A is the washer provided with the perforations $c\ c$. B, Fig. 1, is the hole through which the bolt is passed. C, Fig. 2, is the head of a bolt. $d\ d$, Fig. 2, are nails which prevent the bolt from turning either way. E, Fig. 3, is a nut. $d$, Fig. 3, is a nail which prevents the nut from turning off.

The manner of operation is as follows: The bolt, having been passed through the hole B in the washer A, Fig. 1 is placed in position, when nails $d\ d$, Fig. 2, screws, pins, or other suitable device, are driven through one or more of the holes $c\ c$ and into the piece through which the bolt passes, which nails or other device, projecting a short distance above the washer A, and coming in contact with the corners or sides of the head of the bolt C, Fig. 2, prevent it from turning. The nut E, Fig. 3, is secured in the same manner.

The nail or other device, being surrounded with the solid metallic surface of the washer, is not liable to be pushed to one side by the tendency of the bolt or nut to turn, thus furnishing a cheap and durable method of securing the bolts or nuts in position.

What I claim as my invention is—

The washer A provided with the perforations $c\ c$, substantially as shown and described, and for the purpose set forth.

In testimony whereof I have signed my name to this specification in the presence of two subscribing witnesses.

HARRISON P. HOOD.

Witnesses:
W. COOMBS,
S. C. FRINK.